US012612049B2

(12) United States Patent
Domeyer et al.

(10) Patent No.: US 12,612,049 B2
(45) Date of Patent: Apr. 28, 2026

(54) SYSTEMS AND METHODS FOR MULTI-STAGE RISKY DRIVING MITIGATION

(71) Applicant: Toyota Motor Engineering & Manufacturing North America, Inc., Plano, TX (US)

(72) Inventors: Joshua E. Domeyer, Ypsilanti, MI (US); Rashmi Payyanadan, New York, NY (US); Linda Angell, Grosse Pointe Farms, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP); TOUCHSTONE EVALUATIONS, INC., Grosse Pointe Farms, MI (US)

( * ) Notice: Subject to any disclaimer, the term of this patent is extended or adjusted under 35 U.S.C. 154(b) by 217 days.

(21) Appl. No.: 18/651,059

(22) Filed: Apr. 30, 2024

(65) Prior Publication Data

US 2025/0333066 A1　Oct. 30, 2025

(51) Int. Cl.
B60W 40/09 (2012.01)
B60W 50/00 (2006.01)
B60W 50/14 (2020.01)

(52) U.S. Cl.
CPC ........ B60W 40/09 (2013.01); B60W 50/0097 (2013.01); B60W 50/14 (2013.01);
(Continued)

(58) Field of Classification Search
CPC .. B60W 40/09; B60W 50/0097; B60W 50/14;
B60W 2050/0029;
(Continued)

(56) References Cited

U.S. PATENT DOCUMENTS

| | | | |
|---|---|---|---|
| 8,111,147 | B2 | 2/2012 | Litkouhi |
| 9,586,581 | B2 | 3/2017 | Strauss et al. |

(Continued)

FOREIGN PATENT DOCUMENTS

| | | | | |
|---|---|---|---|---|
| EP | 2148309 | A2 | 1/2010 | |
| KR | 20100049194 | A | 5/2010 | |
| WO | WO-2016206765 | A1 * | 12/2016 | .............. G06N 3/044 |

*Primary Examiner* — Ryan W Sherwin
(74) *Attorney, Agent, or Firm* — Snell & Wilmer LLP

(57) ABSTRACT

Methods, systems, and apparatus for a vehicle monitoring and driver support system. The vehicle monitoring and driver support system includes one or more sensors configured to capture vehicle sensor data of a vehicle and an electronic control unit in electronic communication with the sensors. When a driver is operating the vehicle, the system receives the vehicle sensor data. The system can also receive survey data indicative of a personality and/or an attitude of the driver. Based on the vehicle sensor data and/or the survey data, the system uses a first predictive model to predict a general risky driving behavior. In response to predicting the general risky driving behavior, the system uses a second predictive model to predict a specific risky driving behavior. The system can activate countermeasures to encourage the driver to respond and mitigate the risky driving behavior.

20 Claims, 3 Drawing Sheets

(52) U.S. Cl.
CPC ............... *B60W 2050/0029* (2013.01); *B60W 2420/403* (2013.01); *B60W 2420/54* (2013.01); *B60W 2520/12* (2013.01)

(58) Field of Classification Search
CPC ....... B60W 2420/403; B60W 2420/54; B60W 2520/12; B60W 2540/30; B60W 2556/10
See application file for complete search history.

(56) References Cited

U.S. PATENT DOCUMENTS

| | | | |
|---|---|---|---|
| 9,767,516 | B1 | 9/2017 | Konrardy et al. |
| 9,944,307 | B2 | 4/2018 | Lubischer et al. |
| 11,180,159 | B1 | 11/2021 | Post et al. |
| 11,267,402 | B1 | 3/2022 | Hawley et al. |
| 11,767,036 | B1 | 9/2023 | Agarwal |
| 2006/0235753 | A1* | 10/2006 | Kameyama ........ G06Q 30/0201 |
| | | | 705/15 |
| 2008/0004806 | A1* | 1/2008 | Kimura ................ B60W 50/16 |
| | | | 701/301 |
| 2008/0169914 | A1* | 7/2008 | Albertson ............. G08B 21/06 |
| | | | 340/425.5 |
| 2017/0017927 | A1* | 1/2017 | Domnick ............. B60W 40/04 |
| 2017/0274908 | A1* | 9/2017 | Huai ..................... B60W 50/08 |
| 2018/0105186 | A1* | 4/2018 | Motomura ............ G06V 10/82 |
| 2019/0322285 | A1* | 10/2019 | Lagre ................... G05D 1/0088 |
| 2020/0139975 | A1* | 5/2020 | Ishikawa ................. G06N 3/09 |
| 2021/0009121 | A1* | 1/2021 | Oboril .............. B60W 30/0953 |
| 2021/0125076 | A1* | 4/2021 | Zhang ................... G06N 3/045 |
| 2022/0028258 | A1 | 1/2022 | Sadano et al. |
| 2022/0119004 | A1* | 4/2022 | Avadhanam ........... G06N 20/00 |
| 2022/0306134 | A1* | 9/2022 | Choi ..................... B60W 50/06 |
| 2022/0348217 | A1 | 11/2022 | Jeong et al. |
| 2023/0166731 | A1* | 6/2023 | Heck ................ B60W 50/0097 |
| 2024/0210191 | A1* | 6/2024 | Bhavsar ............... B60W 50/14 |

* cited by examiner

SYSTEMS AND METHODS FOR MULTI-STAGE RISKY DRIVING MITIGATION

BACKGROUND

Field

The present disclosure relates generally to systems and methods for monitoring driver behavior and vehicle driving conditions and, more particularly, to systems and methods for predicting certain driver behaviors, and responding with measures to prevent and/or mitigate risks.

Description of the Related Art

Abundant research on vehicles equipped with advanced driver assistance systems (ADAS) that actively provide information about a vehicle state, a driver state, and traffic environment has been recently carried out to reduce drivers' burden and improve convenience. As an example of an ADAS mounted on a vehicle, a lane following assist (LFA) may plan a driving path and control the vehicle to track the desired path using an active control of an electronic power steering (EPS) to provide convenience to a driver. That is, the lane following assist is a system capable of controlling the vehicle or providing a warning to keep the vehicle within its lane during driving. These systems are reactive.

However, motor vehicles are operated by drivers in various conditions. Lack of sleep, monotonous road conditions, use of items, health-related conditions, and driver propensity, mood, and/or personality can increase the likelihood that a driver may become drowsy, inattentive, or aggressive while driving. A drowsy, inattentive, and/or aggressive driver also has an increased likelihood of creating dangerous driving conditions, which can cause potential harm to the driver, other vehicle occupants, occupants in nearby vehicles, and/or pedestrians.

Accordingly, there is a need for a system and method for monitoring vehicle activities to increase road and vehicle safety.

SUMMARY

In general, one aspect of the subject matter described in this disclosure may be embodied in a monitoring and driver support system for a vehicle. The monitoring system includes a first vehicle sensor configured to capture a first vehicle data of the vehicle, and an electronic control unit (ECU) coupled to the first vehicle sensor. The ECU is configured to receive the first vehicle data. The ECU is further configured to receive a survey data about a driver of the vehicle. The ECU is further configured to analyze the first vehicle data and the survey data using a first machine learning predictive model to predict a general risky driving behavior. The ECU is further configured to predict whether the general risky driving behavior will occur within a first predetermined duration. In response to predicting the general risky driving behavior will occur within the first predetermined duration, the ECU is further configured to initiate a first countermeasure to encourage a first response from the driver of the vehicle. In response to determining the general risky driving behavior, the ECU is further configured to use a second machine learning predictive model to predict a specific risky driving behavior.

These and other embodiments may optionally include one or more of the following features.

In various aspects, the ECU is further configured to determine whether the driver responds to the first countermeasure within a second predetermined duration, and, in response to determining the driver does not respond to the first countermeasure within the second predetermined duration, the ECU uses the second machine learning predictive model to predict the specific risky driving behavior.

In various aspects, the ECU is further configured to predict whether the specific risky driving behavior will occur within a third predetermined duration, and, in response to predicting the specific risky driving behavior will occur within the third predetermined duration, initiate a second countermeasure to encourage a second response from the driver of the vehicle.

In various aspects, the ECU is further configured to determine whether the driver responds to the second countermeasure within a fourth predetermined duration.

In various aspects, in response to determining the driver does not respond to the second countermeasure in a manner that does not lower a likelihood of engaging risky behavior below a set threshold within the fourth predetermined duration, the electronic control unit is configured to escalate the second countermeasure.

In various aspects, after predicting the general risky driving behavior and before using the second machine learning predictive model to predict the specific risky driving behavior, the ECU is further configured to receive real-time vehicle data from the first vehicle sensor and analyze the real-time vehicle data using the second machine learning predictive model to predict the specific risky driving behavior.

In various aspects, the second countermeasure includes modifying a parameter of the vehicle. The parameter can include a vehicle speed, a vehicle acceleration, an accelerator pedal force, a steering angle, among other factors. In various aspects, the second countermeasure can include an alert and/or a warning.

In various aspects, the survey data can include aspects of the driver's psychological state, their driving history, and/or their attitude(s) and belief(s) toward safe driving behavior.

In various aspects, the ECU is further configured to receive a driver data, which can include variables derived from driver data, about the driver of the vehicle. The driver data can be input into the first machine learning predictive model and/or the second machine learning predictive model for predicting the general risky driving behavior and/or the specific risky driving behavior, respectively.

In various aspects, the first vehicle sensor includes an ultrasonic sensor, a camera, and/or a vehicle speed sensor.

In various aspects, the first vehicle data can include data on driving conditions-such as the number and the speed of surrounding vehicles-which may be acquired from vehicle-borne sensor systems. The first vehicle data can include parameters of the vehicle (e.g., speed, GPS location, acceleration, etc.) and/or external environment parameters of the vehicle (e.g., surrounding vehicles, buildings, pedestrians, weather, road conditions, traffic, etc.).

In various aspects, the ECU is further configured to pre-process the first vehicle data to compute at least one of a first feature of the first vehicle data and/or a non-linear component of the first vehicle data, and at least one of the first machine learning predictive model and/or the second machine learning predictive model receive at least one of the first feature and/or the non-linear component as an input to predict the general risky driving behavior and/or the specific risky driving behavior, respectively. In various aspects, the feature is at least one of a mean, a median, a mode, a rolling average, and/or a cumulative sum.

In another aspect, the subject matter may be embodied in a method for predicting risky driving behavior. The method includes receiving, by a monitoring system, a first vehicle data of a vehicle. The method includes receiving, by the monitoring system, a survey data of a driver of the vehicle. The method further includes analyzing, by the monitoring system, the first vehicle data using a first machine learning predictive model to predict a general risky driving behavior. The method further includes predicting, by the monitoring system, whether the general risky driving behavior will occur within a first predetermined duration. The method further includes, in response to predicting the general risky driving behavior will occur within the first predetermined duration, initiating, by the monitoring system, a first countermeasure to encourage a first response from the driver of the vehicle. The method further includes, in response to determining the general risky driving behavior, using, by the monitoring system, a second machine learning predictive model to predict a specific risky driving behavior.

These and other embodiments may optionally include one or more of the following features.

In various aspects, the method further includes determining, by the monitoring system, whether the driver responds to the first countermeasure within a second predetermined duration, and, in response to determining the driver does not respond to the first countermeasure within the second predetermined duration, using, by the monitoring system, the second machine learning predictive model to predict the specific risky driving behavior.

In various aspects, the method further includes predicting, by the monitoring system, whether the specific risky driving behavior will occur within a third predetermined duration, and, in response to predicting the specific risky driving behavior will occur within the third predetermined duration, initiating, by the monitoring system, a second countermeasure to encourage a second response from the driver of the vehicle.

In various aspects, the method further includes determining, by the monitoring system, whether the driver responds to the second countermeasure within a fourth predetermined duration.

In various aspects, the method further includes, in response to determining the driver does not respond to the second countermeasure in a manner that does not lower a likelihood of engaging risky behavior below a set threshold within the fourth predetermined duration, the electronic control unit is configured to escalate the second countermeasure.

In various aspects, after predicting the general risky driving behavior and before using the second machine learning predictive model to predict the specific risky driving behavior, the method further includes receiving, by the monitoring system, real-time vehicle data from a first vehicle sensor, and analyzing, by the monitoring system, the real-time vehicle data using the second machine learning predictive model to predict the specific risky driving behavior.

In various aspects, the second countermeasure includes modifying a parameter of the vehicle. The parameter can include a vehicle speed, a vehicle acceleration, an accelerator pedal force, a steering angle, among other factors. In various aspects, the second countermeasure can include an alert and/or a warning.

In various aspects, the method further includes, in response to determining the driver does not respond to the second countermeasure in a manner that does not lower a likelihood of engaging risky behavior below a set threshold within the fourth predetermined duration, escalating the second countermeasure.

In various aspects, the method further includes receiving, by the monitoring system, a driver data about the driver of the vehicle, and the driver data is an input into at least one of the first machine learning predictive model and/or the second machine learning predictive model for predicting the general risky driving behavior and/or the specific risky driving behavior, respectively.

In another aspect, the subject matter may be embodied in a non-transitory computer-readable medium having stored contents that cause one or more computing systems to perform automated operations. The automated operations include receiving, by the one or more computing systems, a vehicle data measured by one or more vehicle sensors located onboard a vehicle. The automated operations include receiving, by the one or more computing systems, a survey data including data indicative of a personality and/or an attitude of a driver of the vehicle. The automated operations include analyzing, by the one or more computing systems, the vehicle data and the survey data using a first machine learning predictive model to predict a general risky driving behavior. The automated operations include, in response to determining the general risky driving behavior, use a second machine learning predictive model to predict a specific risky driving behavior.

Various aspects are described in a step-by-step manner. However, the methods described herein can be performed continuously while a vehicle is driving using rolling windows across the incoming vehicle data and/or driver data. The steps can also be performed in any order while still maintaining the scope of the invention.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1:
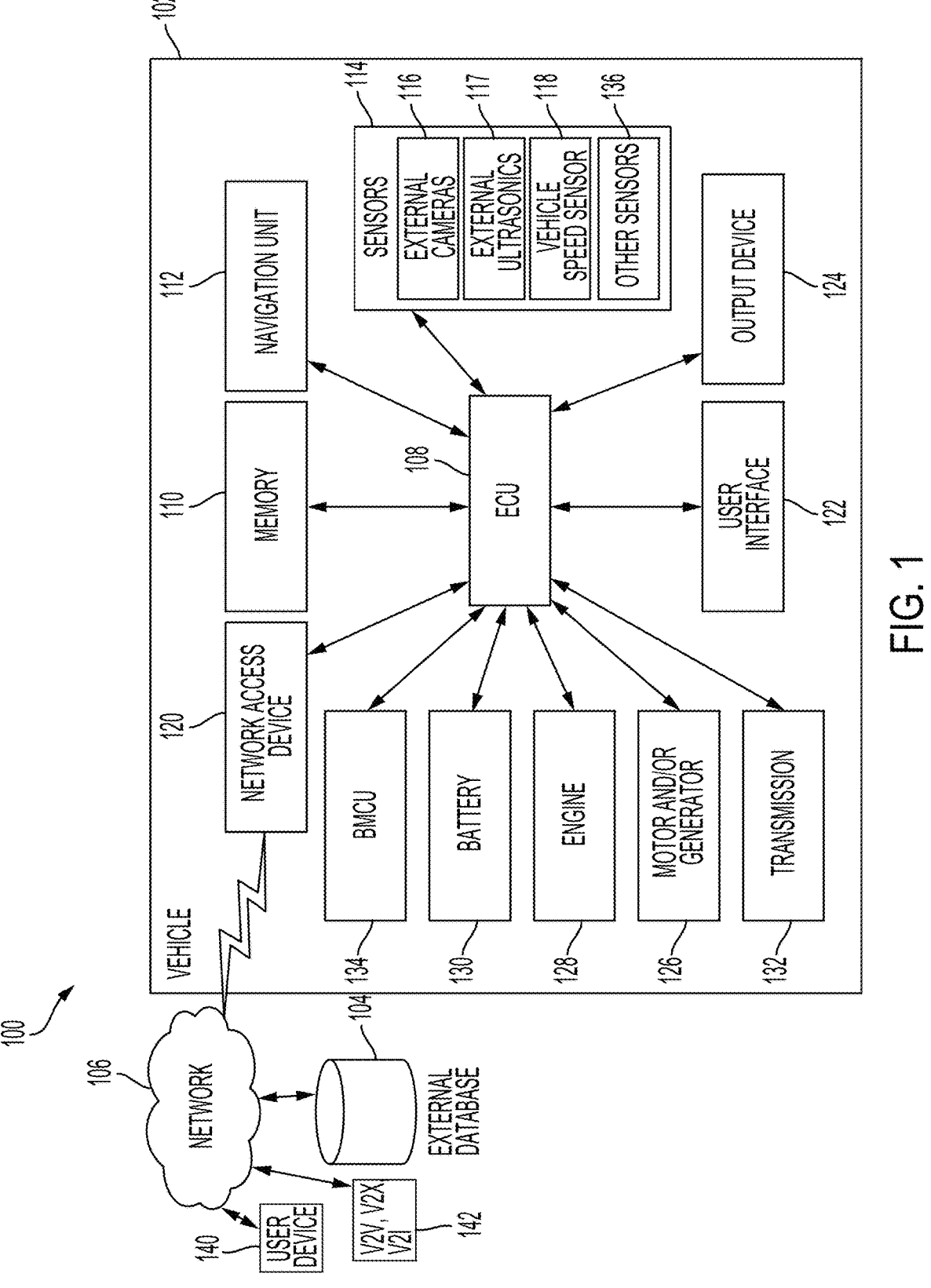
FIG. 1 is a block diagram of an example monitoring and driver support system according to an aspect of the invention.

Disclosed herein are systems, vehicles, and methods for risky driver mitigation. Particular embodiments of the subject matter described in this disclosure may be implemented to realize one or more of the following advantages. The risky driving behavior monitoring, prediction, and mitigation system ("monitoring system") detects, identifies, predicts, and/or anticipates risky driving behavior that occurs and/or may potentially occur in the near future with a vehicle. The monitoring system can control various aspects of the vehicle to warn a driver of the risky driving behavior and/or to mitigate the risky driving behavior, thereby improving vehicle safety. The monitoring system can anticipate risky driving behavior and therefore tends to prevent risky driving conditions before they even occur.

The monitoring system can utilize supervised machine learning predictive models to take into account vehicle data, survey data, driver behavior data, different environmental factors, and/or circumstances of the environment. The monitoring system can utilize a Global Positioning System (GPS) unit for detecting location data including a current location of the vehicle to determine various vehicle traffic, pedestrian traffic, and/or event information of the surrounding environment. In this manner, the monitoring system may account for various environmental factors, such as the time of day, the location, the weather, the traffic congestion or patterns, and/or other factors, in predicting the risky driving behavior. This allows for a more precise and accurate understanding of different risks levels at different locations, times of day, etc. to accurately determine whether risky driving behavior is predicted to occur.

Other benefits and advantages include the use of artificial intelligence including machine learning algorithms with models to anticipate, predict, or otherwise determine when risky driving activity occurs or is about to occur. By anticipating, predicting, or otherwise determining when the risky driving activity occurs or is about to occur, the monitoring system proactively and automatically anticipates the risky driving activity and may act to prevent, report, or otherwise record or document the risky driving behavior. For example, the monitoring system may alert the driver to encourage a corrective response from the driver to prevent risky driving behavior. In another example, the monitoring system may take control of various aspects of the vehicle to prevent risky driving behavior. The monitoring system may learn from each instance of a potentially risky driving behavior and the driver's reaction thereto.

Various aspects refer to "soft" countermeasures and "hard" countermeasures. In general, "soft" countermeasures refer to those that try to nudge or shape behavior through suggestions or encouragement, while "hard" refer to those that directly modify driver behavior through the vehicle interface (e.g., pedal force, availability of features, etc.). In various embodiments, a "first countermeasure" is implemented as a "soft" countermeasure and a "second countermeasure" is implemented as a "hard" countermeasure. However, the first and second countermeasures could be either "hard" or "soft."

FIG. 1 is a block diagram of a monitoring system 100. The monitoring system 100 may be retrofitted, coupled to, include or be included within a vehicle 102. The monitoring system 100 may couple, connect to, or include an external database 104. The monitoring system 100 may have a network 106 that links the external database 104 with the vehicle 102. The network 106 may be a local area network (LAN), a wide area network (WAN), a cellular network, the Internet, or combination thereof, that connects, couples and/or otherwise communicates between the vehicle 102 and the external database 104.

The monitoring system 100 detects, identifies, predicts, and/or anticipates risky driving behavior that occurs and/or may potentially occur in the near future with the vehicle 102. The monitoring system 100 utilizes a general predictive model to detect, identify, predict, and/or anticipate any risky driving behavior, and then subsequently utilizes one or more specific predictive models to detect, identify, predict, and/or anticipate specific risky driving behavior.

The monitoring system 100 may include or be retrofitted or otherwise coupled with the vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The monitoring system 100 includes one or more processors, such as an electronic control unit (ECU) 108 and a memory 110. The monitoring system 100 may include other components, such as a navigation unit 112, one or more sensors 114 (also referred to herein as vehicle sensors) including one or more external cameras 116, one or more external ultrasonic sensors 117, a vehicle speed sensor 118 and/or other sensors 136, a network access device 120, a user interface 122 and/or an output device 124. Other sensors 136 can include cameras, radars, ultrasonics, LiDAR, microphones, etc. The monitoring system 100 may couple, connect to, and/or include one or more vehicle components such as the motor and/or generator 126, the engine 128, the battery 130, the transmission 132 and/or the battery management control unit (BMCU) 134.

The ECU 108 may be implemented as a single ECU or as multiple ECUs. The ECU 108 may be electrically coupled to some or all of the other components within the vehicle 102, such as the motor and/or generator 126, the transmission 132, the engine 128, the battery 130, the battery management control unit (BMCU) 134, the memory 110, the network access device 120, and/or one or more sensors 114. The ECU 108 may include one or more processors or controllers specifically designed for detecting, identifying, predicting, and/or anticipating any risky driving behavior with the vehicle 102. The ECU 108 may monitor the vehicle 102 and/or a driver of the vehicle 102. The ECU 108 may utilize, generate, and/or update predictive models to detect, identify, predict, and/or anticipate risky driving behavior before the risky driving behavior occurs. The ECU 108 can apply general and/or specific countermeasures to help prevent and/or mitigate the risky driving behavior.

The ECU 108 can utilize multiple (e.g., two) predictive models, implemented at different stages, which interface with different countermeasures for reducing risky driving. A first predictive model can receive vehicle data, driver performance data, psychological data, and/or historical trip data to predict the likelihood of a risky driving behavior within some time period. A second predictive model can use vehicle data, driver performance data, psychological data, and/or historical trip data to predict the likelihood of a specific type of risky driving behavior-such as speeding, tailgating, or using a handheld device-within some time period. The first predictive model can employ general "soft" countermeasures (also referred to herein as a first countermeasure), such as prompts to get the driver to look at the road or encouragement to use driving automation features to maintain safe distances. The second predictive model can employ specific or "hard" countermeasures (also referred to herein as a second countermeasure), such as directly encouraging a reduction in speed or increase in headway through an alert or message.

The ECU 108 may analyze vehicle data, which can include parameters of the vehicle 102 (e.g., speed, GPS location, acceleration, etc.) and/or external environment parameters of the vehicle 102 (e.g., surrounding vehicles, buildings, pedestrians, weather, road conditions, etc.) and compare the data to a baseline and/or input the data into a model to detect, identify, predict, and/or anticipate any risky driving behavior. In addition to the vehicle data, the ECU 108 can further use driver performance data, psychological data, and/or historical trip data to help anticipate risky driving behavior. If risky driver behavior is predicted or otherwise determined, the ECU 108 may act to record, document, provide or otherwise act to mitigate consequences of the risky driving behavior. The ECU 108 may be coupled to a memory 110 and execute instructions that are stored in the memory 110.

The memory 110 may be coupled to the ECU 108 and store instructions that the ECU 108 executes. The memory 110 may include one or more of a Random Access Memory (RAM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 108. Moreover, the memory 110 may be used to record and store data before, after, and/or during the occurrence of the risky driving behavior.

The monitoring system 100 may include a user interface 122. The monitoring system 100 may display one or more notifications on the user interface 122. The one or more notifications on the user interface 122 may notify occupants of the vehicle when the monitoring system 100 is initialized or activated. The user interface 122 may include an input/output device that receives user input from a user interface element, a button, a dial, a microphone, a keyboard, or a touch screen. For example, the user interface 122 may receive user input that may include configurations as to the amount of sensor data or the length of the video to record when risky driver behavior is determined. Other configurations may include a preference for the magnitude or the type of countermeasure for mitigating risky driver behavior, for example. The user interface 122 may provide an output to an output device 124, such as a display, a speaker, an audio and/or visual indicator, or a refreshable braille display. For example, the user interface 122 may display an alert, a warning, or a specific countermeasure being taken by the ECU 108.

The monitoring system 100 may include a network access device 120. The network access device 120 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 120 may transmit data to and receive data from the external database 104. For example, the ECU 108 may communicate with the external database 104 to obtain a baseline model and/or a predictive algorithm that consider activities and/or objects at a current location of the vehicle 102, via the network 106. The monitoring system 100 may use the baseline model and/or the predictive algorithm to detect, identify, predict, and/or anticipate risky driving behavior of the vehicle 102.

The network access device 120 may transmit data to and receive data from a user device 140 (e.g., a smart phone, a tablet, a personal computer, etc.) located remotely from the vehicle 102. The monitoring system 100 may display one or more notifications on the user device 140, similar to user interface 122. Accordingly, the user device 140 can have a user interface whereby a user can communicate with the ECU 108 from a remote location.

The network access device 120 may transmit data to and receive data from other databases 142, for example using vehicle-to-vehicle (V2V) communication, vehicle-to-everything (V2X), and/or vehicle-to-infrastructure (V2I). For example, monitoring system 100 can enable vehicle 102 to exchange vehicle data with a second vehicle using V2V communication technology. Monitoring system 100 can receive location data such as traffic congestion, weather advisories, bridge clearance levels, traffic light status, and/or crime data to inform the monitoring system 100 of conditions at or near the location of the vehicle 102 or a location where the vehicle 102 is headed using V2I and/or V2X communication technology. Accordingly, the vehicle 102 may communicate with another vehicle or a network using vehicle-to-vehicle communications or vehicle-to-infrastructure communications via the network access device 120.

The monitoring system may further include a navigation unit 112. The navigation unit 112 may be integral to the vehicle 102 or a separate unit coupled to the vehicle 102, such as a personal device with navigation capabilities. When the navigation unit 112 is separate from the vehicle 102, the navigation unit 112 may communicate with the vehicle 102 via the network access device 120. In some implementations, the vehicle 102 may include a GPS unit for detecting location data including a current location of the vehicle 102 and date/time information instead of the navigation unit 112. In that regard, the ECU 108 may perform the functions of the navigation unit 112 based on data received from the GPS unit. At least one of the navigation unit 112 or the ECU 108 may predict or propose a route set that includes a starting location and a destination location. The navigation unit 112 or the ECU 108 may perform navigation functions. Navigation functions may include, for example, route and route set prediction, providing navigation instructions, and receiving user input such as verification of predicted routes and route sets or destinations. Other information, such as a current speed of the vehicle 102, may be extrapolated, interpreted or otherwise calculated from the data obtained from the navigation unit.

The navigation unit 112 may provide and obtain navigational map information including location data, which may include a current location, a starting location, a destination location and/or a route between the starting location or current location and the destination location of the vehicle 102. The navigation unit 112 may include a memory (not shown) for storing the route data. The navigation unit 112 may receive data from other sensors capable of detecting data corresponding to location information. For example, the other sensors may include a gyroscope or an accelerometer.

The navigational map information may include entity information. The entity information may include locations or places of interest, such as government buildings, commercial businesses, schools, tourist attractions, or other places of interest. These different entities may be one factor in determining whether an object or an action of an object is unusual.

The monitoring system may further include one or more sensors 114. The one or more sensors 114 may include one or more external cameras 116, one or more external ultrasonic sensors, a vehicle speed sensor 118, and/or other sensors 136. The one or more external cameras 116 may include multiple cameras positioned on the outside of the vehicle 102 and/or within the vehicle 102 but directed outward to capture different views of the surrounding environment outside the vehicle 102. The one or more external ultrasonic sensors 117 may include multiple ultrasonic sensors positioned on the outside of the vehicle 102 and/or within the vehicle 102 but directed outward to capture different views of the surrounding environment outside the vehicle 102. The vehicle speed sensor 118 may measure the amount of rotation of the multiple wheels to determine whether the vehicle 102 is stationary and/or parked. The one or more sensors 114 may include other sensors 136 to measure road condition(s), the weather, the ambient lighting surrounding the vehicle 102, or other environmental factors that may be used to predict risky driving behavior. For example, the other sensors 136 can include a gyroscope and/or accelerometer for measuring attitude and/or acceleration of the vehicle 102.

The one or more sensors 114 can include one or more external cameras 116 which can be positioned along the exterior of the vehicle 102, such as along the roof, the trunk, the sides, and/or the front of the vehicle 102. The positions of the external cameras 116 can vary depending on the type of vehicle, among other factors. The different views of the surrounding environment may be used to form a panoramic or 360-degree image of the surrounding environment outside the vehicle 102, which allows the monitoring system 100 to detect other vehicles and/or objects outside the vehicle 102, such as vehicles in front, alongside, or behind the vehicle 102. The one or more external cameras 116 may capture image data that includes a single frame or image or a continuous video of the surrounding environment outside the vehicle 102.

The one or more sensors 114 can include one or more external ultrasonic sensors 117 which can be positioned along the exterior of the vehicle 102, such as along the roof, the trunk, the sides, and/or the front of the vehicle 102. The different views of the surrounding environment may be used to form a panoramic or 360-degree field of view of the surrounding environment outside the vehicle 102, which allows the monitoring system 100 detect other vehicles and/or objects outside the vehicle 102, such as vehicles in front, alongside, or behind the vehicle 102.

The monitoring system 100 may include an output device 124. The output device 124 may be an audio indicator, a visual indicator, a communication device or other output device. The audio or visual indicator may be used to sound an alarm or flash an alarm, respectively, for example. The communication device may be used to contact the police, insurance company, or other entity and provide recordings to the police, insurance company, or other entity. The communication device may notify or provide documentation to the owner of the vehicle 102 that risky driving behavior with the vehicle 102 is about to occur, has occurred, or is occurring.

The monitoring system 100 may couple, connect to, and/or include one or more vehicle components. The one or more vehicle components may include a motor and/or generator 126. The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. In some implementations, the vehicle 102 may include one or more additional power generation devices such as the engine 128 or a fuel cell stack (not shown). The engine 128 combusts fuel to provide power instead of and/or in addition to the power supplied by the motor and/or generator 126.

The battery 130 may be coupled to the motor and/or generator 126 and may provide electrical energy to and receive electrical energy from the motor and/or generator 126. The battery 130 may include one or more rechargeable batteries.

The BMCU 134 may be coupled to the battery 130 and may control and manage the charging and discharging of the battery 130. The BMCU 134, for example, may measure, using battery sensors, parameters used to determine the state of charge (SOC) of the battery 130. The BMCU 134 may control the battery 130.

The one or more vehicle components may include the transmission 132. The transmission 132 may have different gears and/or modes, such as park, drive and/or neutral and may shift between the different gears. The transmission 132 manages the amount of power that is provided to the wheels of the vehicle 102 given an amount of speed.

The monitoring system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may store personalized driver data and/or one or more risky driving predictive models. The external database 104 may be updated and/or provide updates in real-time. The external database 104 may store and/or provide the driver data and/or models to the ECU 108. The external database 104 may also store environmental factors, such as weather information or time of day information, and provide the environmental factors to the ECU 108 to assist in determine whether a driving action is risky or otherwise different from a baseline. The weather information may include the temperature, weather, road conditions, amount of precipitation and/or other weather factors that may affect the determination of an unusual activity. For example, when the weather is cold and there is precipitation, the monitoring system 100 can be more likely to find certain vehicle maneuvers to be risky. As another example, personalized driver data that indicates that a driver has historic risky driving behavior at certain geographical locations, the monitoring system 100 can anticipate and/or be more likely to anticipate risky driving behavior as the driver approaches these predetermined geographical locations.

Figure 2:
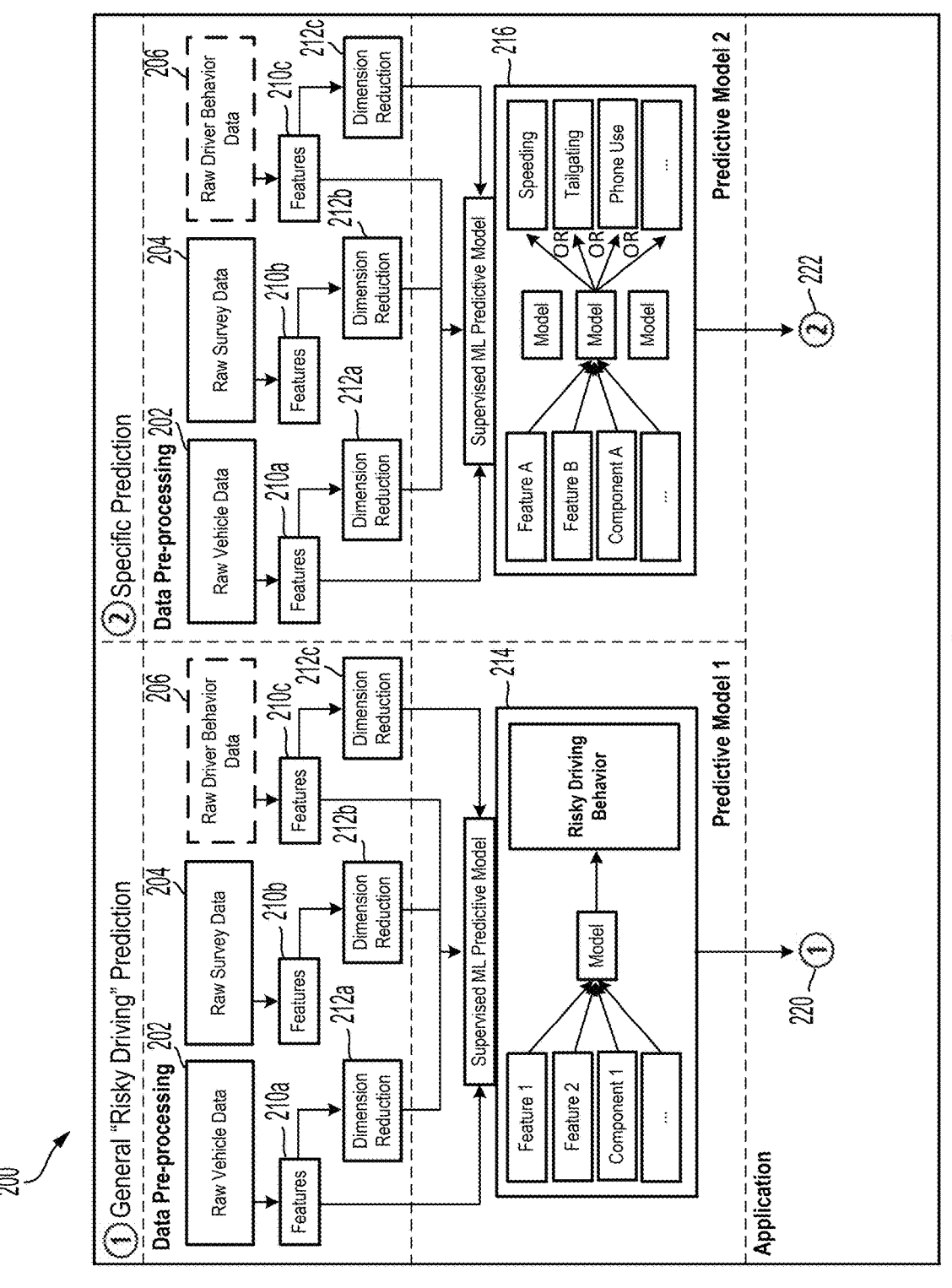
FIG. 2 is a block diagram of example supervised machine learning predictive models for the monitoring system of FIG. 1 according to an aspect of the invention.

FIG. 2 is a flow diagram of an example process 200 for risky driving mitigation. One or more computers or one or more data processing apparatuses, for example, the ECU 108 of the monitoring system 100 of FIG. 1, appropriately programmed, may implement the process 200.

The monitoring system 100 can obtain and utilize various data sets in order to predict risky driving behavior. The monitoring system 100 can receive raw vehicle data 202, raw survey data 204, and/or raw driver behavior data 206 to use as one or more inputs to one or more predictive models (e.g., a first predictive model 214 and/or a second predictive model 216).

Raw vehicle data 202 can include vehicle speed data, vehicle acceleration data, vehicle trip time data, vehicle idle time data, vehicle heading data, vehicle geographic location data, vehicle camera sensor data, vehicle ultrasonic sensor data, vehicle lane position data, and/or any other suitable vehicle data. For example, the raw vehicle data 202 can include data about surrounding vehicles (e.g., a close in-path vehicle). For example, the raw vehicle data 202 can be measured by one or more of the sensors 114 (see FIG. 1). The raw vehicle data 202 can include historical vehicle data.

Raw survey data 204 can include data indicative of a personality and/or attitude of the driver. The raw survey data 204 can include data representing the driver's attitude(s) about risky driving behavior, views toward social norms of risky driving behavior, sensation seeking rating(s), and/or impulsiveness rating(s). In various aspects, the raw survey data 204 is received from the external database 104 and/or the user device 140. For example, the driver can be prompted to take a survey to obtain the raw survey data 204.

Raw driver behavior data 206 can include data about the behavior of the driver. For example, the one or more sensors 114 (see FIG. 1) can include one or more internal sensors located within the cabin of the vehicle and configured to measure one or more parameters of the driver. For example, an internal camera can be used to detect an eye position of the driver, a head position of the driver, and/or a hand position of the driver. One or more of the sensors 114 can be used to detect a standard deviation of a steering wheel angle, a rate of steering change, a driver visual behavior, a percentage of time of the driver looking at specific locations, a driver head orientation, driver eye closure percentage, driver head nodding, and/or stress detection. In various aspects, the raw driver behavior data 206 is received by the monitoring system 100 in real-time. The raw driver behavior data 206 can include historical driver behavior data.

The raw vehicle data 202 can be pre-processed to obtain one or more features 210a. Likewise, the raw survey data 204 can be pre-processed to obtain one or more features 210b. Likewise, the raw driver behavior data 206 can be pre-processed to obtain one or more features 210c. The features 210a, 210b, and/or 210c are referred to herein generally as features 210. In various aspects, the features 210 are computed from the raw data. The features 210 can include a mean, a median, a mode, a rolling average, a cumulative sum, etc. of the raw data 202, 204, and/or 206.

In various aspects, the features 210 can be further pre-processed by performing one or more dimension reduction processes to obtain one or more non-linear components 212 from the feature(s) 210. For example, one or more non-linear components 212a can be computed from the feature(s) 210a, one or more non-linear components 212b can be computed from the feature(s) 210b, and/or one or more non-linear components 212c can be computed from the feature(s) 210c. The one or more non-linear components 212a, 212b, and/or 212c are referred to herein generally as non-linear components 212. A dimension reduction process can compute the non-linear components 212 from the feature 210 that maximizes the variance explained by each component. Example dimension reduction processes include UMAP (Uniform Manifold Approximation and Projection) and PCA (Principal Component Analysis).

One or more of the features 210 and/or the non-linear components 212 can be input into the first predictive model 214. The first predictive model 214 can predict general risky driving behavior. In various aspects, the first predictive model 214 can be a supervised machine learning predictive model. For example, the first predictive model 214 can establish a relationship between the features 210 and/or the components 212 and labeled events in the data using interactions and weights. The first predictive model 214 can implement one or more machine learning techniques to analyze feature vectors within a single domain or across different domains to determine the optimal clustering given a set of input nodes. Machine learning is an area of computer science in which the goal is to develop models using example observations (i.e., training data), that can be used to make predictions on new observations. The models or logic are not based on theory but are empirically based or data driven.

Machine learning can be categorized as supervised or unsupervised. In supervised learning, the training data examples contain labels for the outcome variable of interest. There are example inputs and the values of the outcome variable of interest are known in the training data. The goal of supervised learning is to learn a method for mapping inputs to the outcome of interest. The supervised models then make predictions about the values of the outcome variable for new observations. Supervised learning methods include boosting, neural networks, random forests, support vector machines, among others.

Boosting is a machine learning algorithm which finds a highly accurate hypothesis (e.g., low error rate) from a combination of many "weak" hypotheses (e.g., substantial error rate). Given a data set comprising examples within a class and not within the class and weights based on the difficulty of classifying an example and a weak set of classifiers, boosting generates and calls a new weak classifier in each of a series of rounds. For each call, the distribution of weights is updated that indicates the importance of examples in the data set for the classification. On each round, the weights of each incorrectly classified example are increased, and the weight of each correctly classified example is decreased so the new classifier focuses on the difficult examples (i.e., those examples have not been correctly classified).

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the auto associative neural network, the probabilistic decision-based neural network (PDBNN), and the sparse network of winnows (SNOW).

A random forest is a machine learning algorithm that relies on a combination of decision trees in which each tree depends on the values of a random vector sampled independently and with the same distribution for all trees in the forest. A random forest can be trained for some number of trees 'T' by sampling 'N' cases of the training data at random with replacement to create a subset of the training data. At each node, a number 'm' of the features are selected at random from the set of all features. The feature that provides the best split is used to do a binary split on that node. At the next node, another number 'm' of the features are selected at random, and the process is repeated.

A support vector machine is a machine learning algorithm for calculating a boundary that best separates a set of unit data elements in an n-dimensional space into two classes. The boundary is calculated in such a manner as to maximize the distance to the boundary (margin) for each class.

The first predictive model 214 can implement one or more machine learning techniques to detect, identify, predict, and/or anticipate general risky driving behavior. The first predictive model 214 can generate a general risky driving behavior output 220. The output 220 can indicate that a general risky driving behavior has been detected, identified, predicted, and/or anticipated. For example, the first predictive model 214 can be configured to detect, identify, predict, and/or anticipate a general risk some duration (e.g., X seconds) ahead of a risky driving event. In response to detecting, identifying, predicting, and/or anticipating a general risk and/or a general risky driving behavior with the first predictive model 214, the ECU 108 can be configured to implement a "soft" countermeasure, for example by displaying a warning or behavioral nudge. Stated differently, the monitoring system 100 may operate or control one or more vehicle components in response to predicting the risky driver behavior. For example, with momentary reference to FIG. 1, the ECU 108 can send a warning signal to the user interface 122 and/or the output device 124 to warn the driver that a risky driving behavior has been predicted. The warning signal can be a visual signal (e.g., a light on a vehicle dash cluster), an audio signal, and/or a haptic signal (e.g., a vibration within the driver's seat and/or steering wheel that provides a tactile alert to the driver). An example soft countermeasure can include displaying a message to a driver, such as "we noticed you are at risk of engaging in risky driving behavior." The soft countermeasure can encourage the driver to use driver convenience systems (e.g., adaptive cruise control, lane keeping assist, etc.). The soft countermeasure can include other alerts, warnings, HMI (human-machine interface), etc. as desired.

With reference again to FIG. 2, one or more of the features 210 and/or the non-linear components 212 can be input into the second predictive model 216. In various aspects, the second predictive model 216 can be similar to the first predictive model 214, except that the second predictive model 216 implements a plurality of machine learning techniques to detect, identify, predict, and/or anticipate specific risky driving behavior. Accordingly, although referred to herein as a second predictive model 216, the second predictive model 216 includes a plurality of models for predicting specific risky driving behavior. For example, the first predictive model 214 can detect, identify, predict, and/or anticipate risky driving behavior generally and, in response to the first predictive model 214 detecting, identifying, predicting, and/or anticipating general risky driving behavior, the second predictive model 216 can be utilized to determine which type or types specifically of risky driving behavior is being detected, identified, predicted, and/or anticipated by the first predictive model 214.

In this regard, one or more of the features 210 and/or the non-linear components 212 can be input into the first predictive model 214. In various aspects the first predictive model 214 receives the same data (i.e., the features 210 and/or the components 212) as the second predictive model 216, though the second predictive model 216 can request additional data to detect, identify, predict, and/or anticipate more specific type(s) of risky driving behavior. In this manner, the monitoring system 100 can be more efficient by using less data to first determine whether a risky driving behavior is anticipated, and only then calling on additional data (which is more computationally expensive) to determine the specific risky driving behavior. In this manner, the monitoring system 100 can be more efficient and/or save electric power compared to a system that only implemented a single-stage predictive model.

The second predictive model 216 can utilize one or more supervised machine learning predictive algorithms, including boosting, neural networks, random forests, support vector machines, among others. The second predictive model 216 can determine specific risky driving behavior such as speeding, tailgating, phone use by the driver, among others. In various aspects, the second predictive model 216 utilizes different algorithms to predict different types of risky driving behavior.

The second predictive model 216 can generate one or more specific risky driving behavior outputs 222. The output(s) 222 can indicate that a specific risky driving behavior has been detected, identified, predicted, and/or anticipated. For example, the second predictive model 216 can be configured to detect, identify, predict, and/or anticipate a specific risk some duration (e.g., Y seconds) ahead of a risky driving event. In response to detecting, identifying, predicting, and/or anticipating a specific risk and/or a specific risky driving behavior with the second predictive model 216, the ECU 108 can be configured to implement a "hard" countermeasure, for example by modifying vehicle performance (e.g., limiting vehicle speed and/or acceleration), and/or displaying messaging to encourage stopping of a specific risky behavior. In this regard, the "hard" countermeasure can include modifying a parameter of the vehicle 102, such as a speed of the vehicle 102, an acceleration of the vehicle 102, an accelerator pedal force, and/or a steering angle of a steering wheel of the vehicle 102. For example, with momentary reference to FIG. 1, the ECU 108 can send a warning signal to the user interface 122 and/or the output device 124 to warn the driver that a specific risky driving behavior has been predicted. The warning signal can be a visual signal (e.g., a light on a vehicle dash cluster), an audio signal, and/or a haptic signal (e.g., a vibration within the driver's seat and/or steering wheel that provides a tactile alert to the driver). The ECU 108 can modify vehicle performance by limiting one or more signals sent to the engine 128, the motor and/or generator 126, and/or the transmission 132 to limit vehicle speed and/or acceleration.

For example, if the specific risky behavior is determined to be speeding, the ECU 108 can issue messaging to the driver such as "slow down," the ECU 108 can modify accelerator pedal force, the ECU 108 can activate a seat vibration feedback signal, the ECU 108 can enable adaptive cruise control at a lower speed, among others.

In another example, if the specific risky behavior is determined to be tailgating, the ECU 108 can issue messaging to the driver such as "increase headway," the ECU can modify adaptive cruise control distance, the ECU 108 can display green, yellow, and/or red headway to indicate a headway distance, among others.

In another example, if the specific risky behavior is determined to be holding and/or using a cell phone, the ECU 108 can issue messaging to the driver such as "put down your phone," the ECU can modify accelerator pedal force, the ECU 108 can lower one or more driver monitoring thresholds (e.g., to increase sensitivity of the predictive models to risky driving behavior), among others.

Figure 3:
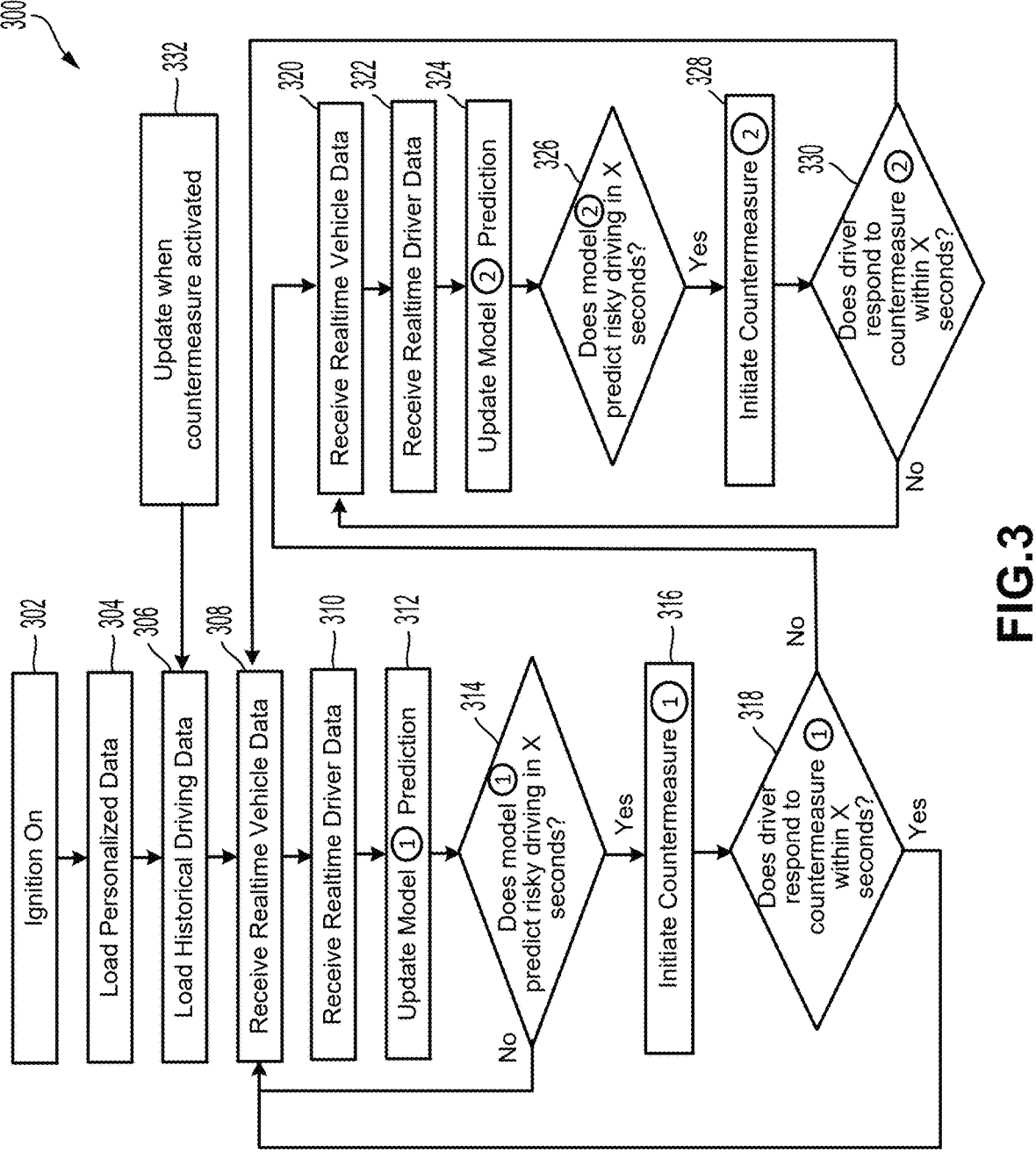
FIG. 3 is a flow diagram of an example process for risky driving mitigation using the monitoring system of FIG. 1 according to an aspect of the invention.

FIG. 3 is a flow diagram of an example process 300 for risky driving mitigation. One or more computers or one or more data processing apparatuses, for example, the ECU 108 of the monitoring system 100 of FIG. 1, appropriately programmed, may implement the process 300. Various aspects of the process 300 are similar to the process 200 of FIG. 2.

With combined reference to FIG. 1 and FIG. 3, the ECU 108 can detect an ignition of the vehicle 102 is turned on (302).

The ECU 108 can load personalized data for use in a predictive model (304). The personalized data can be similar to the raw survey data 204 described with respect to FIG. 2.

The ECU 108 can further load historical driving data for use in a predictive model (306). Historical driving data can include historical vehicle data and/or historical driver data.

The ECU 108 can receive real-time vehicle data (308). The real-time vehicle data can be similar to the raw vehicle data 202 described with respect to FIG. 2.

The ECU 108 can receive real-time driver data (310). The real-time driver data can be similar to the raw driver behavior data 206 described with respect to FIG. 2.

The ECU 108 can update a first model prediction (312). For example, the ECU 108 can implement the first predictive model 214 to generate the output 220.

The ECU 108 can determine whether the first model predicts general risky driving within a predetermined duration (314), also referred to herein as a first predetermined duration. If no risky driving is predicted within the predetermined duration, the process can proceed to step 308. If risky driving is predicted within the predetermined duration, the ECU 108 can initiate a countermeasure (316). For example, the ECU 108 can implement a "soft" countermeasure as described with respect to FIG. 2.

The ECU 108 can further determine whether the driver responds to the countermeasure implemented in step 316 within a predetermined duration (318), also referred to herein as a second predetermined duration. If the driver responds to the countermeasure and/or takes corrective action in a manner that reduces their likelihood of engaging in risky behavior below a set threshold within the predetermined duration, the process can proceed to step 308. If the driver does not respond within the predetermined duration, or if the driver's response does not lower the likelihood of engaging in risky behavior below the set threshold, the ECU 108 can proceed with the second predictive model to determine more specific risky driving behavior. For example, the ECU 108 receive real-time vehicle data (320). Step 320 can be similar to step 308. The ECU 108 can further receive real-time driver data (322). Step 322 can be similar to step 310. For example, steps 320 and 322 can involve updating the model input data to ensure the latest available data is being used by the predictive model(s).

The ECU 108 can update a second model prediction (324) using the latest received input data. For example, the ECU 108 can implement the second predictive model 216 to generate the output 222.

The ECU 108 can determine whether the second model predicts specific risky driving within a predetermined duration (326), also referred to herein as a third predetermined duration. If risky driving is predicted within the predetermined duration, the ECU 108 can initiate a countermeasure (328). For example, the ECU 108 can implement a "hard" countermeasure as described with respect to FIG. 2.

The ECU can further determine whether the driver responds to the countermeasure implemented in step 328 within a predetermined duration (330), also referred to herein as a fourth predetermined duration. If the driver responds to the countermeasure and/or takes corrective action in a manner that reduces their likelihood of engaging in risky behavior below a set threshold within the predetermined duration, the process can proceed to step 308. If the driver does not respond within the predetermined duration, or if the driver's response does not lower the likelihood of engaging in risky behavior below the set threshold, the ECU 108 can proceed to step 320.

In various aspects, if the driver does not respond within the predetermined duration, or if the driver's response does not lower the likelihood of engaging in risky behavior below the set threshold, the ECU 108 can proceed to escalate the intervention, for example by bringing the vehicle 102 to a stop on the side of the roadway, by disabling desirable features in the vehicle 102 (e.g., touchscreen display, automation features, etc.) until the next driver or until some predetermined condition is met (e.g., driver agrees to driver more carefully via prompt on the touchscreen, etc.).

In various aspects, the historical driving data can be updated each time a countermeasure is activated, for example in step 316 and/or step 328 (332). In this regard, the historical driving data can include historical driving data including dates, times, and/or locations that other risky driving behaviors have been predicted by the ECU 108 for the vehicle 102.

The monitoring system 100 may use the navigation unit 112 to obtain the navigational map information including a current location of the vehicle 102 and other entity information, such as places of interest in proximity or within a threshold distance of the vehicle 102. The monitoring system 100 may extract the current location and/or the other entity information from the navigational map information. For example, the monitoring system 100 may use a GPS system to determine the current location of the vehicle 102. In some implementations, the monitoring system 100 may provide the current location of the vehicle 102 to an external database 104 to obtain nearby entity information to identify different places of interest in proximity to the vehicle 102 and/or weather information.

Once the monitoring system 100 obtains the current location of the vehicle 102, the monitoring system 100 may obtain or generate a perceived risk level at the current location of the vehicle. The risk level can be based on a time of day, nearby events, expected pedestrian density, etc. For example, a high rate of speed along a freeway can be considered to be normal, whereas the same high rate of speed through a parking lot can be considered to be risky driving behavior. In another example, the typical or general foot traffic in a shopping mall, park, baseball stadium, restaurant or other entity may be different than the foot traffic in a residential area. In another example, when the vehicle 102 is driving in adverse weather conditions, the likelihood of a risky driving behavior to occur can be more than when the vehicle 102 is driving in ideal weather conditions. For example, the monitoring system 100 can take into account weather data, time of day data, location data, etc. received from the external database 104 and/or sensors 114 onboard the vehicle 102. Thus, the predictive models can take into account the location of the vehicle 102, environmental factors, and the time of day.

The monitoring system 100 may provide the current location of the vehicle 102 to the external database 104. In response, the external database 104 may provide the corresponding location data to the monitoring system 100, which the monitoring system 100 receives. Location data can include weather conditions at a location of the vehicle. For example, cold weather can have adverse effects on vehicle 102 stability and handling and so the monitoring system 100 can be configured to take into account these factors. Location data can include real-time traffic data.

In various aspects, in response to predicting risky driver behavior, the monitoring system 100 can send a notification to the user device 140, for example, to notify the owner of the vehicle 102 that risky driving behavior has been determined.

The monitoring system 100 may provide the risky driving behavior output and/or other sensor data to a consumer. A consumer is a computing device of a person, a government agency, a business, or other entity that may use the external image data. For example, a government agency, such as the police department, may use the risky driving behavior data to identify a vehicle that caused an accident. In another example, the monitoring system 100 may provide external image data that includes image data of the vehicle that collided with the vehicle 102 including the license plate number, make and model of the vehicle and circumstances of the accident, to an insurance company to accompany a claim. The recorded information may allow for a claims adjuster or owner of the vehicle 102 to identify any lost or damaged items from within the vehicle 102.

Table 1 below provides example parameters and their effects for an example predictive model for predicting or otherwise determining speeding. The below example prediction model provided an AUC (area under the receiver operating characteristic curve) of 0.88. AUC is a frequently used estimate to describe the discriminatory ability of a clinical prediction model. The AUC is often interpreted relative to thresholds, with "good" or "excellent" modes defined at 0.7, 0.8, or 0.9. Average speeding onset occurred 4.4% of the time for the example model during testing.

TABLE 1

| | | | % Effect (Relative to Mean Speeding Onset) | |
|---|---|---|---|---|
| Features | Importance scores | Effect size | | Directionality |
| Percent idling | 1.00 | 0.014 | 31% | Positive |
| Percent speeding | 0.78 | 0.018 | 42% | Positive |
| Driving kinematics PC3 lag 2 sec | 0.71 | 0.013 | 30% | Negative |
| Driving kinematics PC4 lag 4 sec | 0.71 | 0.009 | 21% | Negative |
| Tailgating flag lag 2 sec | 0.23 | 0.007 | 16% | Positive |
| TPB speeding PC4 | 0.13 | 0.002 | 5% | Negative |
| TPB NDRT PC4 | 0.11 | 0.002 | 5% | Neutral |
| TPB HUP PC8 | 0.09 | 0.010 | 24% | Positive |
| Speed (flag) lag 2 sec | 0.05 | 0.014 | 31% | Positive |

Example Predictive Model: Variable Effects

Driving kinematics PC3 represents driving conditions characterized by high traffic density and frequent occurrences of closest in-path vehicle events. This variable indicates instances, where the driver is navigating through heavy, slow-moving traffic conditions.

Driving kinematics PC4 represents driving conditions where the driver had recently engaged in tailgating behavior and experienced recent stretches of tailgating in an environment that included other road users, such as pedestrians, motorcycles, and bicycles.

TPB speeding PC4 reflects drivers' attitudes and norms towards speeding, specifically their perceived behavioral control over their speeding behavior and severity of potential crashes resulting from speeding. This variable has a negative effect on the likelihood of speeding, indicating that drivers with less favorable attitudes toward speeding and high perceived severity of crashing during speeding were less likely to speed.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A monitoring and driver support system for a vehicle, comprising:
   a first vehicle sensor configured to capture a first vehicle data of the vehicle;
   an electronic control unit coupled to the first vehicle sensor, and configured to:
      receive the first vehicle data;
      receive a survey data about a driver of the vehicle;
      analyze the first vehicle data and the survey data using a first machine learning predictive model to predict a general risky driving behavior;
      predict whether the general risky driving behavior will occur within a first predetermined duration;
      in response to predicting the general risky driving behavior will occur within the first predetermined duration, initiate a first countermeasure to encourage a first response from the driver of the vehicle; and
      in response to determining the general risky driving behavior, use a second machine learning predictive model to predict a specific risky driving behavior.

2. The monitoring and driver support system of claim 1, wherein the electronic control unit is further configured to:
   determine whether the driver responds to the first countermeasure within a second predetermined duration; and
   in response to determining the driver does not respond to the first countermeasure within the second predetermined duration, the electronic control unit uses the second machine learning predictive model to predict the specific risky driving behavior.

3. The monitoring and driver support system of claim 2, wherein the electronic control unit is further configured to:
   predict whether the specific risky driving behavior will occur within a third predetermined duration; and
   in response to predicting the specific risky driving behavior will occur within the third predetermined duration, initiate a second countermeasure to encourage a second response from the driver of the vehicle.

4. The monitoring and driver support system of claim 3, wherein the electronic control unit is further configured to determine whether the driver responds to the second countermeasure within a fourth predetermined duration.

5. The monitoring and driver support system of claim 4, wherein, after predicting the general risky driving behavior and before using the second machine learning predictive model to predict the specific risky driving behavior, the electronic control unit is further configured to:

receive real-time vehicle data from the first vehicle sensor; and analyze the real-time vehicle data using the second machine learning predictive model to predict the specific risky driving behavior.

6. The monitoring and driver support system of claim 4, wherein the second countermeasure includes modifying a parameter of the vehicle.

7. The monitoring and driver support system of claim 4, wherein, in response to determining the driver does not respond to the second countermeasure in a manner that does not lower a likelihood of engaging risky behavior below a set threshold within the fourth predetermined duration, the electronic control unit is configured to escalate the second countermeasure.

8. The monitoring and driver support system of claim 1, wherein the electronic control unit is further configured to:

receive a driver data about the driver of the vehicle; and the driver data is an input into at least one of the first machine learning predictive model or the second machine learning predictive model for predicting the general risky driving behavior and/or the specific risky driving behavior, respectively.

9. The monitoring and driver support system of claim 1, wherein the first vehicle sensor includes at least one of an ultrasonic sensor, a camera, or a vehicle speed sensor.

10. The monitoring and driver support system of claim 1, wherein the electronic control unit is further configured to:

pre-process the first vehicle data to compute at least one of a first feature of the first vehicle data or a non-linear component of the first vehicle data; and at least one of the first machine learning predictive model or the second machine learning predictive model receive at least one of the first feature or the non-linear component as an input to predict the general risky driving behavior and/or the specific risky driving behavior, respectively.

11. The monitoring and driver support system of claim 10, wherein the feature is at least one of a mean, a median, a mode, a rolling average, or a cumulative sum.

12. A method for predicting risky driving behavior, comprising:

receiving, by a monitoring system, a first vehicle data of a vehicle;

receiving, by the monitoring system, a survey data of a driver of the vehicle;

analyzing, by the monitoring system, the first vehicle data and the survey data using a first machine learning predictive model to predict a general risky driving behavior;

predicting, by the monitoring system, whether the general risky driving behavior will occur within a first predetermined duration;

in response to predicting the general risky driving behavior will occur within the first predetermined duration, initiating, by the monitoring system, a first countermeasure to encourage a first response from the driver of the vehicle; and in response to determining the general risky driving behavior, using, by the monitoring system, a second machine learning predictive model to predict a specific risky driving behavior.

13. The method of claim 12, further comprising:

determining, by the monitoring system, whether the driver responds to the first countermeasure within a second predetermined duration; and in response to determining the driver does not respond to the first countermeasure within the second predetermined duration, using, by the monitoring system, the second machine learning predictive model to predict the specific risky driving behavior.

14. The method of claim 13, further comprising:

predicting, by the monitoring system, whether the specific risky driving behavior will occur within a third predetermined duration; and in response to predicting the specific risky driving behavior will occur within the third predetermined duration, initiating, by the monitoring system, a second countermeasure to encourage a second response from the driver of the vehicle.

15. The method of claim 14, further comprising determining, by the monitoring system, whether the driver responds to the second countermeasure within a fourth predetermined duration.

16. The method of claim 15, wherein, after predicting the general risky driving behavior and before using the second machine learning predictive model to predict the specific risky driving behavior, the method further comprises:

receiving, by the monitoring system, real-time vehicle data from a first vehicle sensor; and analyzing, by the monitoring system, the real-time vehicle data using the second machine learning predictive model to predict the specific risky driving behavior.

17. The method of claim 16, wherein the second countermeasure includes modifying a parameter of the vehicle.

18. The method of claim 15, further comprising, in response to determining the driver does not respond to the second countermeasure in a manner that does not lower a likelihood of engaging risky behavior below a set threshold within the fourth predetermined duration, escalating the second countermeasure.

19. The method of claim 12, further comprising:

receiving, by the monitoring system, a driver data about the driver of the vehicle; and wherein the driver data is an input into at least one of the first machine learning predictive model or the second machine learning predictive model for predicting the general risky driving behavior and/or the specific risky driving behavior, respectively.

20. A non-transitory computer-readable medium having stored contents that cause one or more computing systems to perform automated operations, the automated operations including at least:

receiving, by the one or more computing systems, a vehicle data measured by one or more vehicle sensors located onboard a vehicle;

receiving, by the one or more computing systems, a survey data including data indicative of a personality and/or an attitude of a driver of the vehicle;

analyzing, by the one or more computing systems, the vehicle data and the survey data using a first machine learning predictive model to predict a general risky driving behavior; and in response to determining the general risky driving behavior, use a second machine learning predictive model to predict a specific risky driving behavior.

\* \* \* \* \*